(12) United States Patent
Amamori

(10) Patent No.: US 7,213,833 B2
(45) Date of Patent: May 8, 2007

(54) EMBLEM, MODULE COVER AND AIRBAG APPARATUS

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/035,973

(22) Filed: Jan. 18, 2005

(65) Prior Publication Data
US 2005/0156408 A1    Jul. 21, 2005

(30) Foreign Application Priority Data
Jan. 16, 2004    (JP)    ............................ 2004-009420

(51) Int. Cl.
*B60R 21/215*    (2006.01)
(52) U.S. Cl. ...................... 280/728.3; 40/593
(58) Field of Classification Search ............. 280/728.3; 40/622, 593
See application file for complete search history.

(56) References Cited

U.S. PATENT DOCUMENTS

| | | | | |
|---|---|---|---|---|
| 5,499,842 A * | 3/1996 | Yamamoto et al. | ...... | 280/728.3 |
| 5,678,851 A | 10/1997 | Saito et al. | | |
| 5,685,056 A * | 11/1997 | Fischer | .................. | 29/512 |
| 5,775,721 A * | 7/1998 | Grout | ........................ | 280/727 |
| 5,851,022 A * | 12/1998 | Yamamoto et al. | ...... | 280/728.3 |
| 5,947,511 A * | 9/1999 | Usui et al. | ............... | 280/728.3 |
| 6,003,895 A * | 12/1999 | Niwa et al. | ............... | 280/728.3 |
| 6,053,526 A * | 4/2000 | Preisler et al. | ........... | 280/728.2 |
| 6,168,187 B1 * | 1/2001 | Yamada et al. | .......... | 280/728.3 |
| 6,247,724 B1 * | 6/2001 | Jambor et al. | .............. | 280/731 |
| 6,443,484 B2 * | 9/2002 | Anglsperger | ............. | 280/728.3 |
| 6,508,143 B2 * | 1/2003 | Ibe et al. | ....................... | 74/552 |
| 6,546,659 B1 * | 4/2003 | Imai et al. | .................... | 40/662 |
| 6,561,538 B2 * | 5/2003 | Ford et al. | ............... | 280/728.2 |
| 6,581,311 B1 * | 6/2003 | Davey et al. | .................. | 40/593 |
| 6,585,288 B2 * | 7/2003 | Nishiura et al. | ......... | 280/728.3 |
| 6,613,415 B2 * | 9/2003 | Iida et al. | ................... | 428/139 |
| 6,695,344 B2 * | 2/2004 | Hauer | ........................ | 280/731 |
| 6,760,989 B2 * | 7/2004 | Peterson et al. | .............. | 40/593 |
| 6,942,246 B2 * | 9/2005 | Hohne et al. | ................ | 280/731 |
| 6,951,349 B2 * | 10/2005 | Yokota et al. | ............ | 280/728.2 |
| 2001/0030414 A1 * | 10/2001 | Yokota et al. | ............ | 280/728.3 |
| 2002/0005631 A1 * | 1/2002 | Varcus et al. | ............. | 280/728.3 |
| 2002/0050704 A1 * | 5/2002 | Abe | ........................ | 280/743.1 |
| 2003/0042717 A1 * | 3/2003 | Hauer | ........................ | 280/731 |
| 2003/0151235 A1 * | 8/2003 | Hohne et al. | ................ | 280/731 |
| 2004/0231211 A1 * | 11/2004 | Johnson | ........................ | 40/594 |
| 2005/0067815 A1 * | 3/2005 | Dearden et al. | ......... | 280/728.3 |
| 2005/0079305 A1 * | 4/2005 | Krappmann | ............... | 428/35.7 |

FOREIGN PATENT DOCUMENTS

| | | |
|---|---|---|
| JP | 10-273004 | 10/1998 |
| JP | 11-189119 | 7/1999 |
| JP | 11-314554 | 11/1999 |
| JP | 2001-55107 | 2/2001 |
| JP | 2003-146167 | 5/2003 |

\* cited by examiner

*Primary Examiner*—Faye M. Fleming
*Assistant Examiner*—Barry Gooden, Jr.
(74) *Attorney, Agent, or Firm*—Manabu Kanesaka

(57) ABSTRACT

An emblem is disposed on an external surface of a module cover of an airbag apparatus. The emblem has a narrow width portion and at least two wide width portions with the narrow width portion in between. The emblem includes a reinforcing member disposed on a backside thereof and extending through the narrow width portion to the wide width portions.

5 Claims, 4 Drawing Sheets

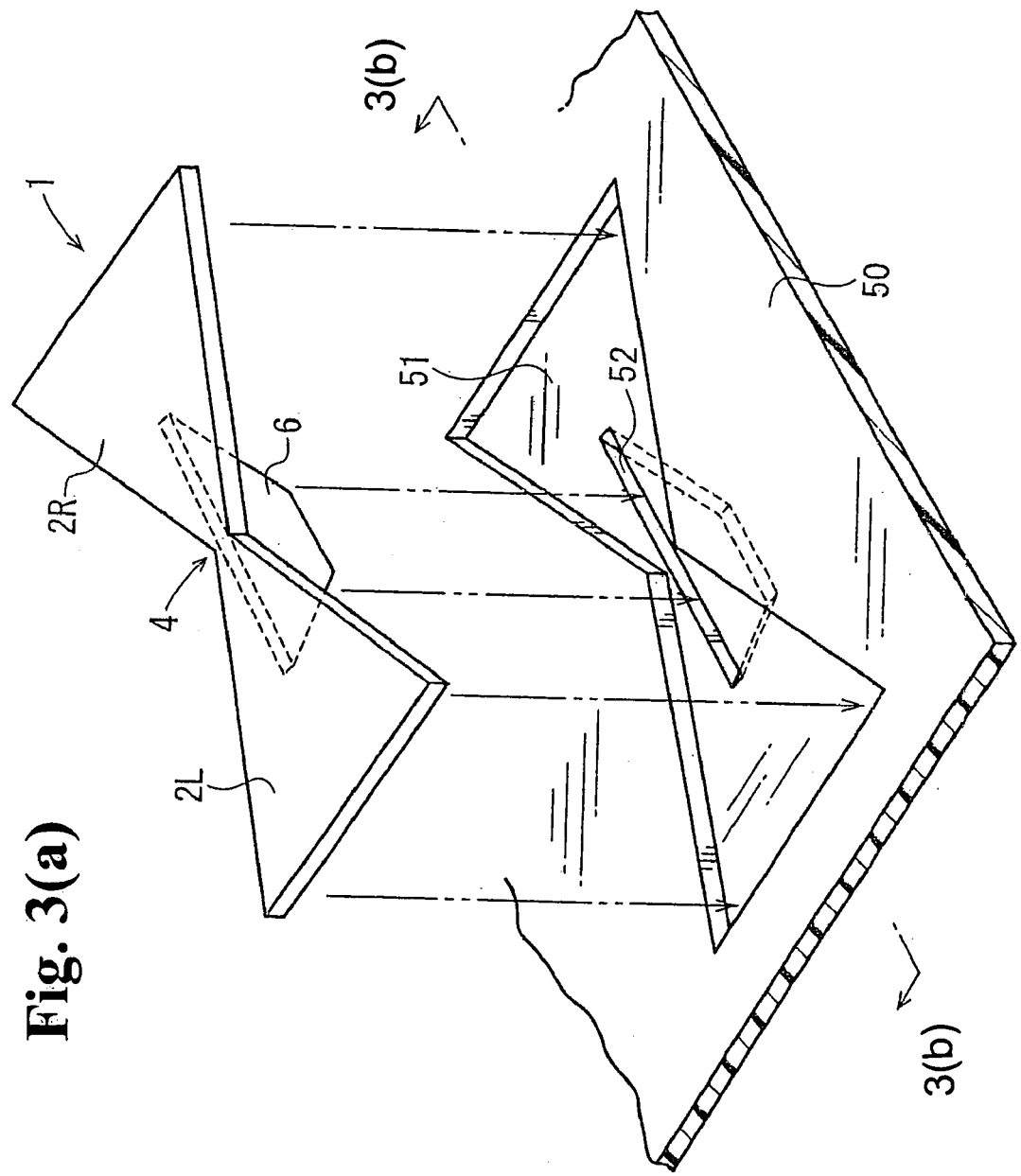

EMBLEM, MODULE COVER AND AIRBAG APPARATUS

BACKGROUND OF THE INVENTION AND RELATED ART STATEMENT

The present invention relates to an emblem disposed on an external surface of a module cover of an airbag apparatus, a module cover of an airbag apparatus having the emblem disposed on the external surface thereof, and an airbag apparatus including the module cover.

An airbag apparatus protects a passenger against an impact in case of a car collision or the like, and includes a driver airbag apparatus, a passenger airbag apparatus, a side airbag apparatus, and so forth. A driver airbag apparatus is disposed in a boss portion of a steering wheel, and is formed of an inflator for ejecting gas, an airbag, a module cover for covering the airbag, and so forth.

A module cover of an airbag apparatus, especially, a driver airbag apparatus, often has a decorative plate fixed thereon as referred to as an emblem. An emblem is generally fixed to a module cover with an emblem-fitting depression provided in a front surface of the module cover. In this case, a through-hole is formed in the depression, and a leg protruding from the emblem is inserted into the hole. An end of the leg is bent along an internal surface of the module cover (for example, refer to Japanese Patent Publication (Kokai) No. 2003-146167).

Japanese Patent Publication (Kokai) No. 2003-146167 has disclosed an emblem formed of a disk-shaped metal plate with an engraved logo such as a symbol of an auto manufacturer and a car name and fixed to a module cover. When an emblem carries a logo such as a symbol of an auto manufacturer or a car name, the emblem may have a narrow portion (a narrow width portion) with respect to a width depending on a design. When the emblem with such a narrow width portion is fixed to a module cover of an airbag apparatus, the emblem may receive a concentrated stress on the narrow width portion thereof when an airbag is inflated and the module cover is torn.

An object of the present invention is to provide an emblem with a sufficient strength at a narrow width portion thereof, a module cover of an airbag apparatus having the emblem disposed on an external surface thereof, and an airbag apparatus equipped with the module cover.

Further objects and advantages of the invention will be apparent from the following description of the invention.

SUMMARY OF THE INVENTION

In order to attain the objects described above, according to a first aspect of the present invention, an emblem is disposed on an external surface of a module cover of an airbag apparatus. The emblem has a narrow width portion and at least two wide width portions with the narrow width portion in between. The emblem includes a reinforcing member disposed on a backside thereof and extending through the narrow width portion to the wide width portions.

According to a second aspect of the present invention, a module cover of an airbag apparatus has the emblem of the first aspect disposed on an external surface thereof.

According to the present invention, the module cover of the second aspect has an emblem-fixing area formed of a depression in the external surface thereof for engaging the emblem. A dent is formed in the emblem-fixing area for inserting the reinforce member.

According to a fourth aspect of the present invention, an airbag apparatus includes the module cover of the present invention.

In the present invention, the reinforcing member is disposed on the backside of the emblem, and extends through the narrow width portion to the wide width portions, so that the emblem has a high strength. Accordingly, when an airbag is expanded and the module cover of the airbag apparatus with the emblem fixed thereto is torn, the narrow width portion does not break and scatter due to the tearing impact.

In the present invention, even when the emblem has the narrow width portion, the narrow width portion has a sufficient strength. Accordingly, it is possible to provide the emblem fixed to the module cover of an airbag apparatus with a variety of designs.

Further, the emblem-fixing area formed of a depression is disposed in the external surface of the module cover for engaging the emblem. The dent is disposed in the emblem-fixing area for inserting the reinforce member. Accordingly, it is possible to securely fix the emblem to the module cover.

BRIEF DESCRIPTION OF THE DRAWINGS

FIGS. 3(a) and 3(b) are views showing an engaging relationship between the emblem and a module cover, wherein FIG. 3(a) is an exploded perspective view, and FIG. 3(b) is a sectional view taken along line 3(b)—3(b) in FIG. 3(a).

DETAILED DESCRIPTION OF PREFERRED EMBODIMENTS

Figure 1A:
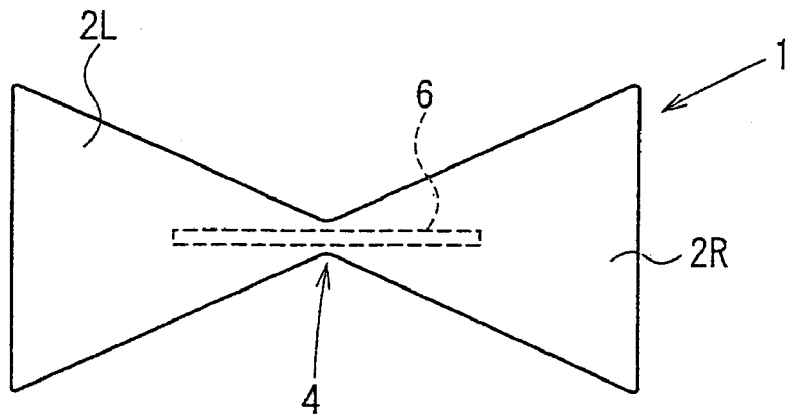
FIGS. 1(a) to 1(c) are views showing an emblem according to an embodiment of the present invention.
Figure 1B:
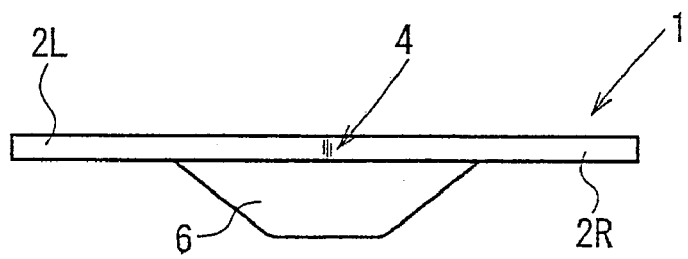
Figure 1C:
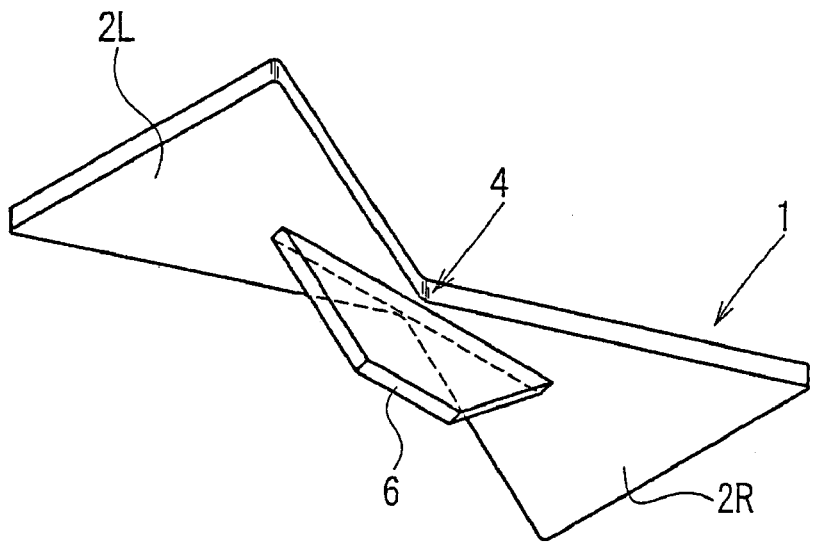
Figure 3B:
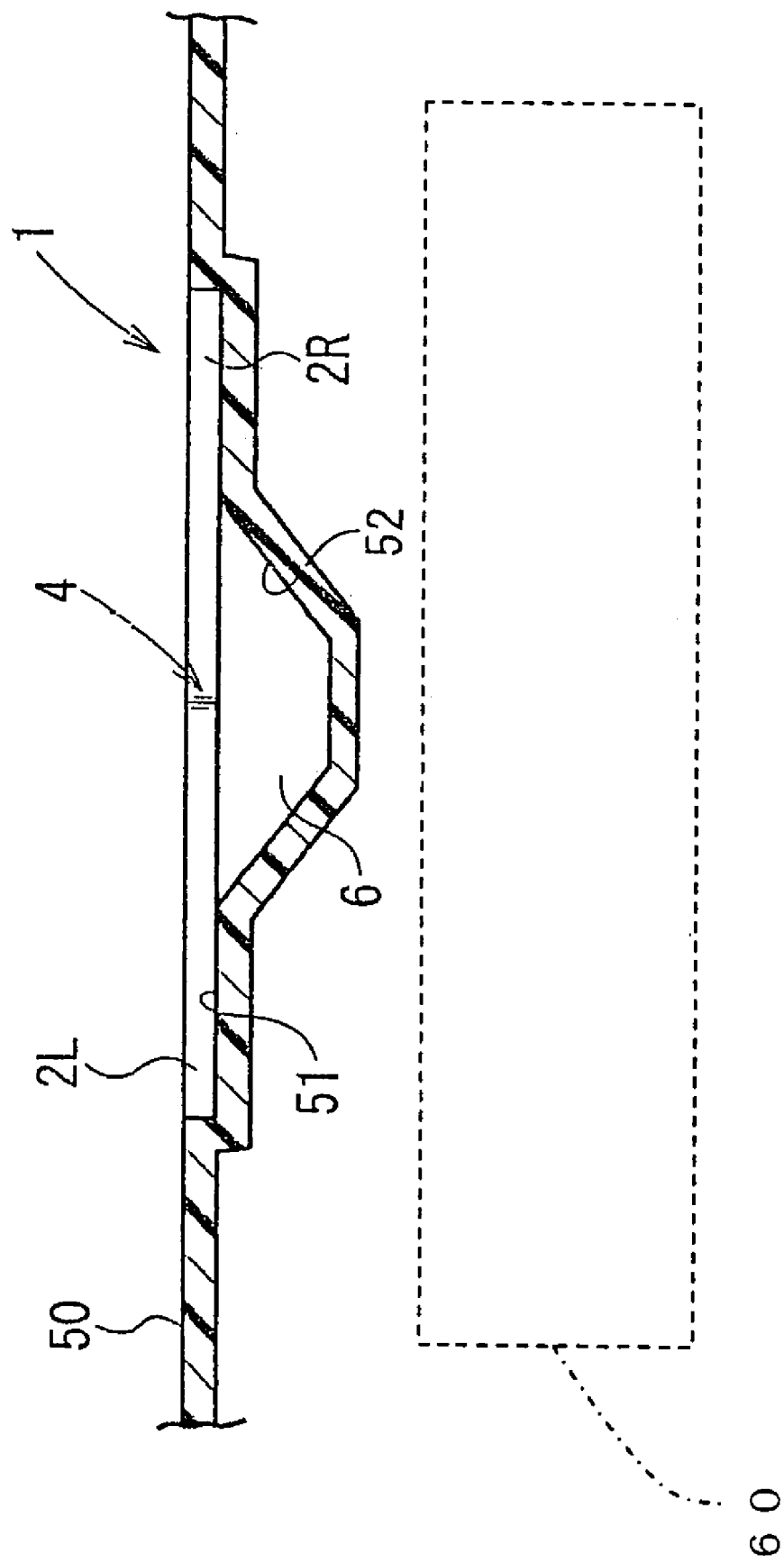

Hereunder, embodiments of the present invention will be described with reference to the accompanying drawings. FIG. 1(a) is a plan view of an emblem according to an embodiment of the present invention, FIG. 1(b) is a side view of the emblem, and FIG. 1(c) is a perspective view of the emblem viewed from a backside thereof. FIGS. 3(a) and 3(b) are an exploded perspective view and a sectional view showing an engaging relationship between the emblem and a module cover, respectively.

In the embodiment, as shown in FIG. 1(a), an emblem 1 has a shape in which two triangular portions 2L and 2R are arranged on left and right sides and apex portions thereof are connected. More specifically, the emblem 1 has a narrow width portion 4 with a vertically narrow width at the middle in the right-to-left direction as a narrow portion, and the triangular portions 2L and 2R with a vertical width grater than that of the narrow width portion 4 at left and right sides of the narrow width portion 4 as a wide width portion.

As shown in FIGS. 1(b) and 1(c), a rib 6 is disposed on a backside of the emblem 1 as a reinforcing member for reinforcing the narrow width portion 4. As shown in FIG. 1(a), the rib 6 extends in the left-to-right direction so as to extend through the narrow width portion 4 up to middle portions of the triangular portions 2L and 2R.

The emblem 1 having the above-described structure is fixed on an external surface of a module cover 50 of an airbag apparatus. As shown in FIG. 3, an emblem-fixing area 51 formed of a shallow depression is disposed in the external surface of the module cover 50. The emblem-fixing area 51 has a shape for retaining the triangular portions 2L and 2R.

The emblem-fixing area 51 has a dent 52 for inserting the rib 6 disposed on the backside of the emblem 1.

The emblem 1 can be fixed to the module cover 50 with a variety of methods such as bonding and welding. Alternatively, similar to a method disclosed in Japanese Patent Publication (Kokai) No. 2003-146167, a leg (not shown) may protrude from the backside of the emblem 1, and is inserted into a through-hole formed in the emblem-fixing area 51 of the module cover 50. An end portion of the leg is bent along an internal surface of the module cover 50.

The module cover 50 having the emblem 1 fixed thereon is placed in the airbag apparatus so as to cover a folded body of an air bag (not shown). The module cover 50 is formed of a synthetic resin and is torn when the airbag is expanded.

In the embodiment, the rib 6 is disposed on the backside of the emblem 1 so as to extend through the narrow width portion 4 to the triangular portions 2L and 2R at both sides of the narrow width portion 4. Accordingly, the narrow width portion 4 has a high strength and is difficult to break when the module cover 50 of the airbag apparatus with the emblem 1 is torn upon expansion of the airbag.

According to the present invention, even when the emblem has the narrow width portion, the narrow width portion has a sufficient strength, so that it is possible to provide the emblem with various design features, which is fixed to a module cover of an air bag apparatus 60.

Figure 2A:
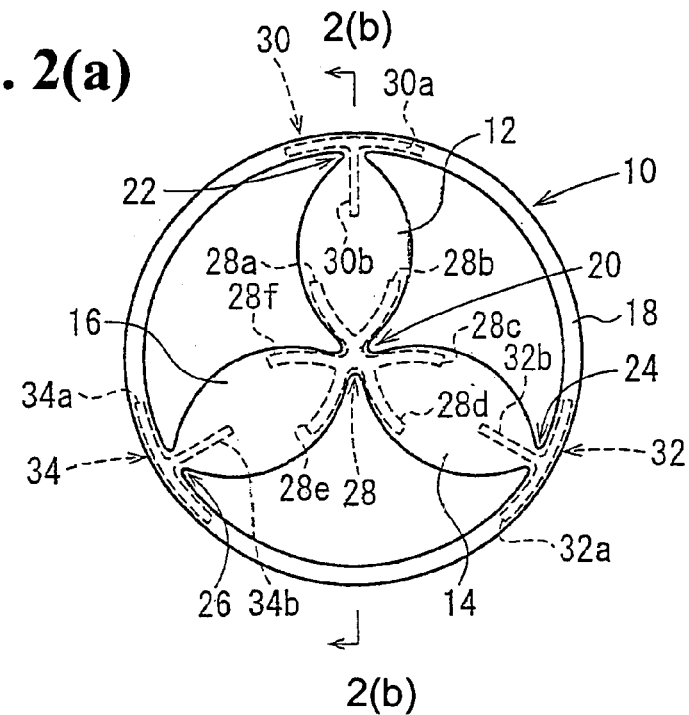
FIGS. 2(a) to 2(c) are views showing an emblem according to another embodiment of the present invention.
Figure 2B:
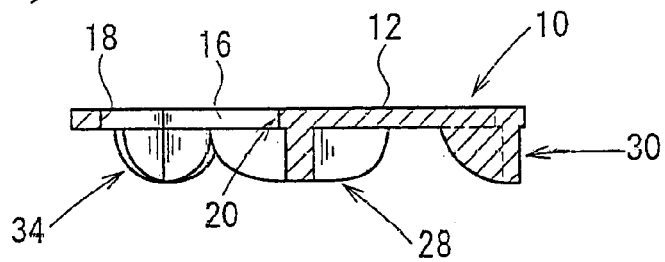
Figure 2C:
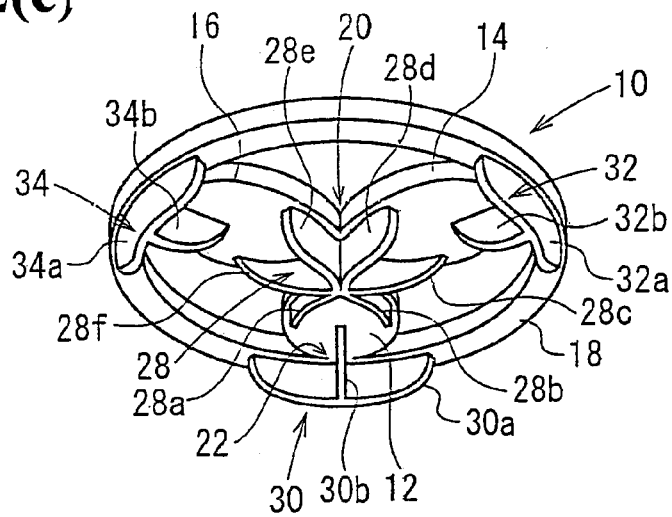

FIG. 2(a) is a plan view of an emblem 10 according to another embodiment of the present invention, FIG. 2(b) is a sectional view taken along line 2(b)—2(b) in FIG. 2(a), and FIG. 2(c) is a perspective view of the emblem 10 viewed from a backside thereof.

In this embodiment, as shown in FIG. 2(a), the emblem 10 has three elliptical portions 12, 14, and 16 such that long axes thereof extend radially in three directions. The elliptical portions 12, 14, and 16 have one end portions in the long axis direction, and the one end portions are connected together. A circular portion 18 is arranged around the elliptical portions 12, 14, and 16. The elliptical portions 12, 14, and 16 have the other end portions in the long-axis direction, and the other end portions are connected to an internal surface of the circular portion 18.

In the emblem 10, a narrow width portion 20 is formed at a connecting portion where the one end portions of the elliptical portions 12, 14, and 16 are connected together. Further, narrow width portions 22, 24, and 26 are formed at connecting portions where the other end portions of the elliptical portions 12, 14, and 16 are connected to the internal surface of the circular portion 18, respectively. Ribs 28, 30, 32, and 34 are disposed on the backside of the emblem 10 as reinforcing members of the narrow width portions 20, 22, 24, and 26, respectively.

In the embodiment, as shown in FIGS. 2(a) and 2(c), the rib 28, i.e., the reinforcing member of the narrow width portion 20, is formed of small ribs 28a, 28b, 28c, 28d, 28e, and 28f (hereinafter, referred to as small ribs 28a to 28f) extending from the narrow width portion 20 radially along both side edges of the elliptical portions 12, 14, and 16. The small ribs 28a and 28b extend from the narrow width portion 20 along both side edges of the elliptical portion 12. The small ribs 28c and 28d extend from the narrow width portion 20 along both side edges of the elliptical portion 14. The small ribs 28e and 28f extend from the narrow width portion 20 along both side edges of the elliptical portion 16. The small ribs 28a to 28f are connected together at the narrow width portion 20.

The ribs 30, 32, and 34, i.e., the reinforcing members of the narrow width portions 22, 24, and 26, are formed of arch-shaped small ribs 30a, 32a, and 34a extending along the circular portion 18 and small ribs 30b, 32b, and 34b, respectively. The small ribs 30b, 32b, and 34b extend in the long axis directions of the elliptical portions 12, 14, and 16, and are joined to middle portions of the small ribs 30a, 32a, and 34a in the extending directions thereof, respectively.

The emblem 10 is fixed to a module cover of an airbag apparatus in the same fashion as the emblem 1 shown in FIG. 1. The structure of the module cover and the airbag apparatus is the same as that in the previous embodiment.

In the emblem 10 having the structure described above, the ribs 28, 30, 32, and 34 are disposed on the backside of the emblem 10 for reinforcing the narrow width portions 20, 22, 24, and 26, respectively. Accordingly, each of the narrow width portions 20, 22, 24, and 26 has a high strength, and is difficult to break when the module cover of the airbag apparatus with the emblem 10 is torn upon expansion of an airbag.

In the embodiments, the reinforcing member of the narrow width portion is formed of the rib with a wall shape protruding from the backside of the emblem, and the structure of the reinforcing member is not limited to the embodiments. For example, the emblem may have a thick wall portion as a reinforcing member. The reinforcing member may be disposed integrally with or independently from the emblem. In the present invention, the emblem may be designed other than those shown in the drawings.

The disclosure of Japanese Patent Application No. 2004-009420, filed on Jan. 16, 2004, is incorporated in the application.

While the invention has been explained with reference to the specific embodiments of the invention, the explanation is illustrative and the invention is limited only by the appended claims.

What is claimed is:

1. An emblem to be disposed on an external surface of a module cover of an airbag apparatus, comprising:
    a narrow width portion extending horizontally,
    at least one wide width portion extending horizontally adjacent to the narrow width portion and having a width greater than that of the narrow width portion, said widths of the at least one wide portion and said narrow width portion being measured in same orientations, and
    a reinforcing member disposed on and integrally attached to a backside of the narrow width portion and at least one wide width portion to protrude substantially perpendicularly thereto, said reinforcing member extending through the narrow width portion to the wide width portion,
    wherein said narrow width portion is arranged between two wide width portions, said reinforcing member extending between the two wide width portions through the narrow width portion.

2. An emblem according to claim 1, wherein said reinforcing member has a trapezoidal shape with long and short sides, said long side being attached to the narrow and wide width portions.

3. A module cover of an airbag apparatus comprising the emblem according to claim 1.

4. A module cover according to claim 1, further comprising an emblem-fixing area formed of a depression for engaging the emblem, and a dent formed in the emblem-fixing area for inserting the reinforce member.

5. An airbag apparatus including the module cover according to claim 1.

* * * * *